United States Patent [19]
Kuroiwa

[11] Patent Number: 5,245,531
[45] Date of Patent: Sep. 14, 1993

[54] MULTIPLEXED DIGITAL CONTROL DEVICE

[75] Inventor: Akihiko Kuroiwa, Fuchu, Japan

[73] Assignee: Kabushiki Kaisha Toshiba, Kawasaki, Japan

[21] Appl. No.: 986,892

[22] Filed: Dec. 8, 1992

Related U.S. Application Data

[63] Continuation of Ser. No. 486,161, Feb. 28, 1990, abandoned.

[30] Foreign Application Priority Data

Mar. 10, 1989 [JP] Japan .................................. 1-58803

[51] Int. Cl.$^5$ ........................ G06F 15/46; G06F 11/18
[52] U.S. Cl. ................................... 364/187; 364/138; 371/9.1; 371/68.3
[58] Field of Search ............... 364/138, 139, 148, 152, 364/184-187; 371/68.1, 68.2, 68.3, 71, 36, 37.9, 9.1

[56] References Cited

U.S. PATENT DOCUMENTS

| | | | |
|---|---|---|---|
| 3,829,668 | 8/1974 | Noumi et al. | 236/153 |
| 4,130,241 | 12/1978 | Meredith et al. | 371/68.3 |
| 4,327,437 | 4/1982 | Frosch et al. | 371/68.3 |
| 4,593,396 | 6/1986 | Anderson, Jr. | 371/68.3 |
| 4,622,667 | 11/1986 | Yount | 364/184 |
| 4,644,538 | 2/1987 | Cooper et al. | 371/68.1 X |
| 4,667,284 | 5/1987 | Asami | 364/187 |
| 4,799,140 | 1/1989 | Dietz et al. | 371/36 X |

FOREIGN PATENT DOCUMENTS

| | | |
|---|---|---|
| 60-103402 | 6/1985 | Japan . |
| 60-189002 | 9/1985 | Japan . |
| 61-109102 | 5/1986 | Japan . |
| 62-214402 | 9/1987 | Japan . |
| 63-108403 | 5/1988 | Japan . |
| 2030334 | 4/1980 | United Kingdom . |

Primary Examiner—Joseph Ruggiero
Attorney, Agent, or Firm—Foley & Lardner

[57] ABSTRACT

A multiplexed digital control device includes a plurality of control circuits and a main signal selection circuit for selecting and outputting a specific signal among the outputted manipulated variables of the plurality of the control circuits according to a predetermined logic. Each control circuit has sub-signal selection means for comparing an internal data of the control circuit obtained as a result of control operation thereof for an identical input signal of the device with internal data of other control circuits obtained as a result of control operations thereof and selecting a specific data among them, according to a predetermined logic. The specific data selected by the sub-signal selection means is outputted as a manipulated variable of its own control system.

10 Claims, 5 Drawing Sheets

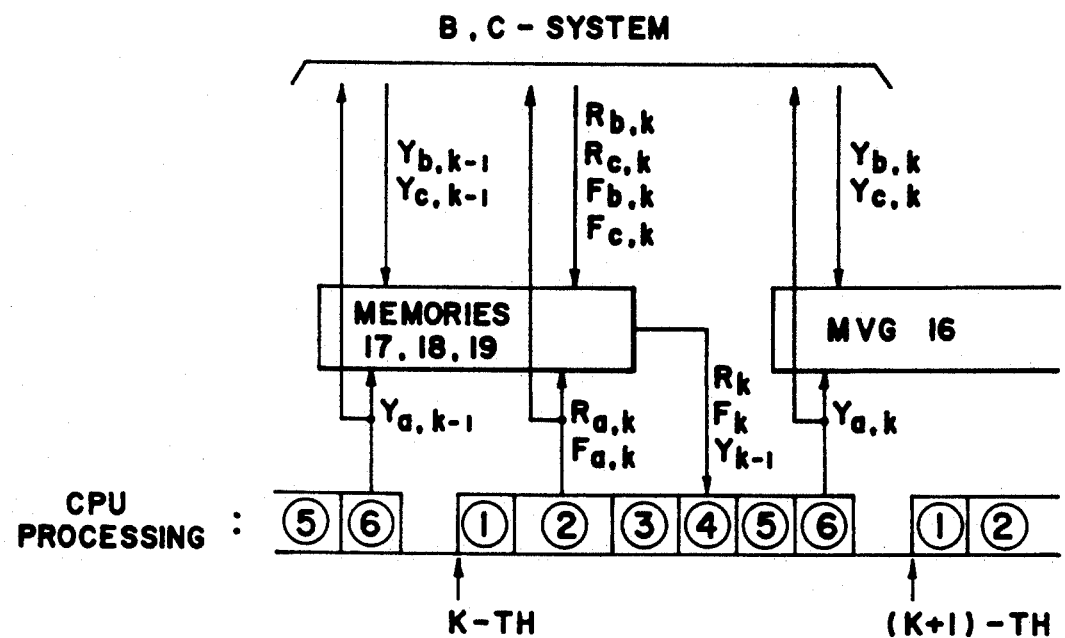
F I G. 4
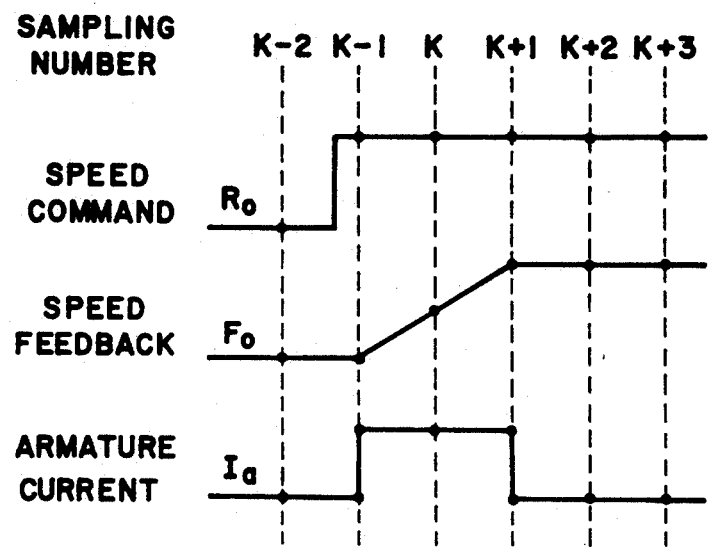
F I G. 5

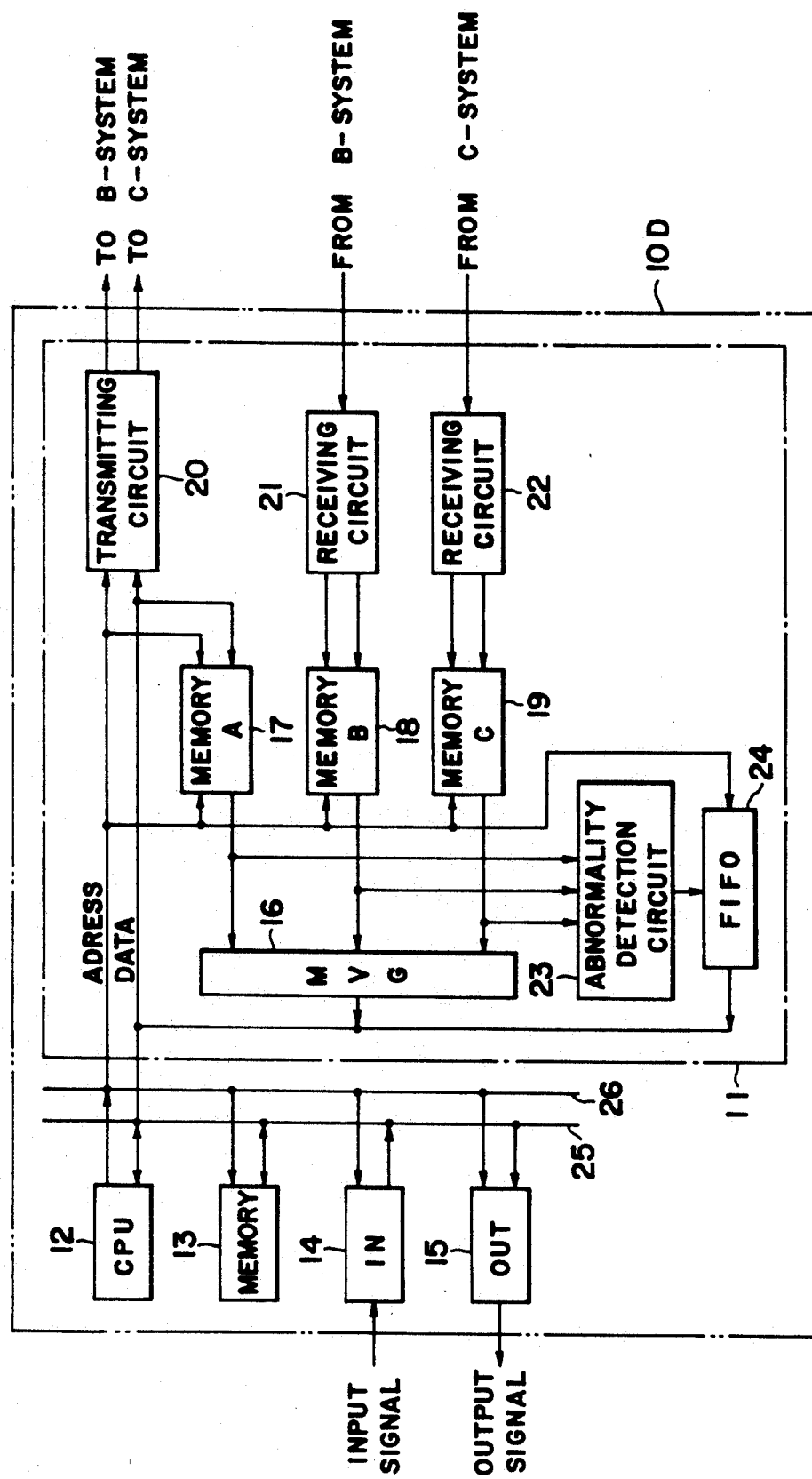
F I G. 6

MULTIPLEXED DIGITAL CONTROL DEVICE

This application is a continuation of application Ser. No. 07/486,161, filed Feb. 28, 1990, now abandoned.

FIELD OF THE INVENTION

The present invention relates to a multiplexed digital control device suitable for use as a control device which is required to perform a high speed real time control with high reliability.

DESCRIPTION OF THE PRIOR ART

A multiplexed control device has been proposed which has a plurality of control circuits provided for a common controlled system and operated according to a common command and a common controlled variable to obtain a respective manipulated variable and to select a specific manipulated variable, such as manipulated variable having a middle value, from the obtained manipulated variables by means of a signal selection circuit and to output it as a final manipulated variable $Y_o$. The system to be controlled is controlled according to the final manipulated variable $Y_o$. The controlled variable is obtainable from the controlled system.

In such multiplexed control devices as mentioned above, manipulated variables at outputs of the respective control circuits are equal to each other when the operations of these control circuits are normal. Assuming that there are three control circuits, the values of manipulated variables $y_a$, $y_b$ and $y_c$ obtained at outputs of these circuits are 99, 100 and 101, respectively, and that the signal selection circuit operates to select a median, the signal selection circuit selects the median $y_b$ and outputs it as the final manipulated variable $Y_o$.

If the second control circuit malfunctions and provides $y_b = 0$, the signal selection circuit selects $y_a 99$ as the median and outputs it as the final manipulated variable $Y_o$. If $y_b$ becomes 200, the signal selection circuit selects $y_o = 101$ as the median and provides it as the final manipulated variable $Y_o$.

Thus, the output manipulated variable $Y_o$ of the control device as a whole becomes a value within a range from the minimum value (99) and the maximum value (101) of the output manipulated variables $y_a$, $y_b$ and $y_c$ of the three control circuits operating normally even if any of these control circuits malfunctions, so that the malfunctioning control circuit does not directly affect the environmental construction.

In a case where the respective control circuits include integrating elements, however, operation errors for them are accumulated by the integrating elements causing the error to be increased. Such defects have been avoided by an error compensation circuit. In a system including such an error compensation circuit having a correction gain K, a deviation between the manipulated variable $Y_o$ from the signal selection circuit and an output manipulated variable $y_a$ of the control circuit including such an integrating element is given positive-feedback through the error correction circuit to an input side of the integrating element. A correction to be performed by this error correction circuit continues until $Y_o$ becomes equal to $y_a$. As a result, the terms of integration of the outputs of the individual control circuits are normally coincident with each other, so that the multiplexed control device is kept stable.

In a case where such a multiplexed control device is realized by using digital technologies however, the data transmission between the respective control systems and operation of the correction circuit become complicated. Therefore, in such a case, the sampling period for control must be lengthened and thus it cannot be applied to a control system in which considerably varying, high speed signals are to be processed.

SUMMARY OF THE INVENTION

An object of the present invention is to provide a multiplexed digital control device which is capable of setting a sampling period shorter and which can reliably operate in control systems which process considerably varying and high speed signals.

The above object is achieved, according to the present invention, by a multiplexed digital control device comprising a plurality of control systems for providing a manipulated variable necessary to coincide a controlled variable from a common controlled system with a common command and a main signal selection means responsive to a predetermined logic for selecting a specific signal from the output manipulated variable of the control systems, wherein each of the control systems includes a first memory for storing internal data thereof obtained as a result of its control operation, transmitting means for transmitting the internal data with address information to other control systems, receiving means for receiving internal data of the other control systems transmitted thereto, second memories for storing the internal data transmitted from the other control systems and received by the receiving means to the addresses designated by the address information transmitted, sub-signal selection means for reading internal data among those stored in the first and second memories and related to identical input signals of the respective control systems and for selecting a specific data from them according to the predetermined logic, and output means for outputting the data selected by the sub-signal selection means to the main signal selection means as the output manipulated variable of its own control system.

In each of the control systems, data such as input data, integration data and/or operation data, etc., which are necessary to perform a control operation are inputted, at a time when they are supplied or produced, to a signal selection circuit of the control system, in which they are stored and transmitted to other control systems in the form of data with address information. These data transmitted from other control systems are received and then stored into memories. At this time, the addresses of the memories for storing data are designated by address information added to data. In order to carry out the control operation, data of the control system and other control systems are read out from the respective memories. These data are compared with each other and then one of them is selected according to the predetermined logic. Thus, identical control operations are performed on identical data in the respective control systems, so that the identification of output of the respective control systems can be held.

Since, in this case, internal variables such as integration data are corrected not gradually but at every control sampling, the equality of data in the respective control systems is maintained. For a complicated control system which has a number of outputs and a number of internal variables, it is possible to shorten the sampling period and realize high speed control.

BRIEF DESCRIPTION OF THE DRAWING

In the accompanying drawings,

FIG. 4 illustrates an operation of a CPU and memories of the control device shown in FIG. 2;

FIG. 5 is a graph showing examples of motor speed and response of an armature current when a speed command is stepped up; and FIG. 6 is a block diagram showing an internal configuration of each control circuit of another embodiment of a multiplexed digital control device.

DESCRIPTION OF THE PREFERRED EMBODIMENTS

Figure 1:
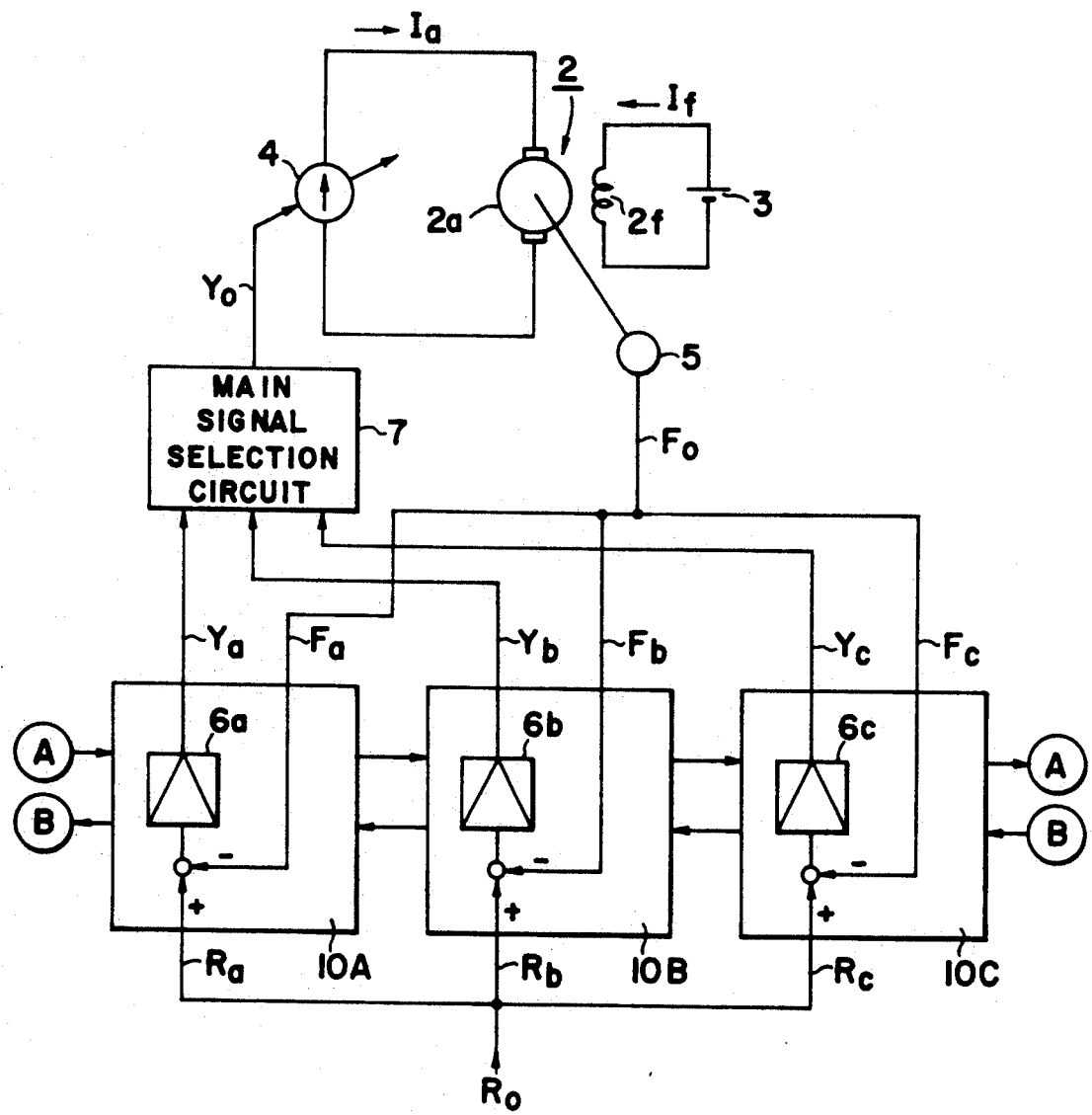
FIG. 1 is a block diagram showing the entire configuration of a multiplexed digital control device according to the present invention.

FIG. 1 shows an embodiment of a multiplexed digital control device according to the present invention when applied to a speed control for a D.C. motor. In this embodiment, the multiplexed digital control device includes three control circuits having identical construction. In order to control the speed of a D.C. motor 2 having an armature 2a and a field winding 2f, a constant field current $I_f$ is supplied from a field power source 3 to the field winding 2f and an armature current $I_a$ supplied from a variable current source 4 to the armature 2a is regulated. A rotational speed $F_o$ of the D.C. motor 2 is detected by a speed detector 5 as a controlled variable which is inputted to the three control circuits 10A, 10B and 10C as speed feedback signals $F_a$, $F_b$ and $F_c$, respectively. The feedback signals $F_a$, $F_b$ and $F_c$ supplied to the respective control circuits 10A, 10B and 10C are compared with speed commands $R_a$, $R_b$ and $R_c$ obtained from a common speed command $R_o$, respectively, and manipulated variables $Y_a$, $Y_b$ and $Y_c$ which are necessary to make deviations between the speed commands and feedback signals zero, are obtained by speed controllers 6a, 6b and 6c by taking manipulated variables obtained by other control circuits into consideration as will be described later. The manipulated variables $Y_a$, $Y_b$ and $Y_c$ are supplied to a main signal selection circuit 7 from which a manipulated variable having a specific value is outputted according to a predetermined logic as a final manipulated variable $Y_s$. The main signal selection circuit 7 is constructed as a median selection circuit (MVG), for example, which compares the manipulated variables $Y_a$, $Y_b$ and $Y_c$ with each other and selects one of them which corresponds to a median as a final output manipulated variable $Y_o$. The variable current source 4 responds to the final oputput manipulated variable $Y_o$ to control the armature current $I_a$.

Figure 2:
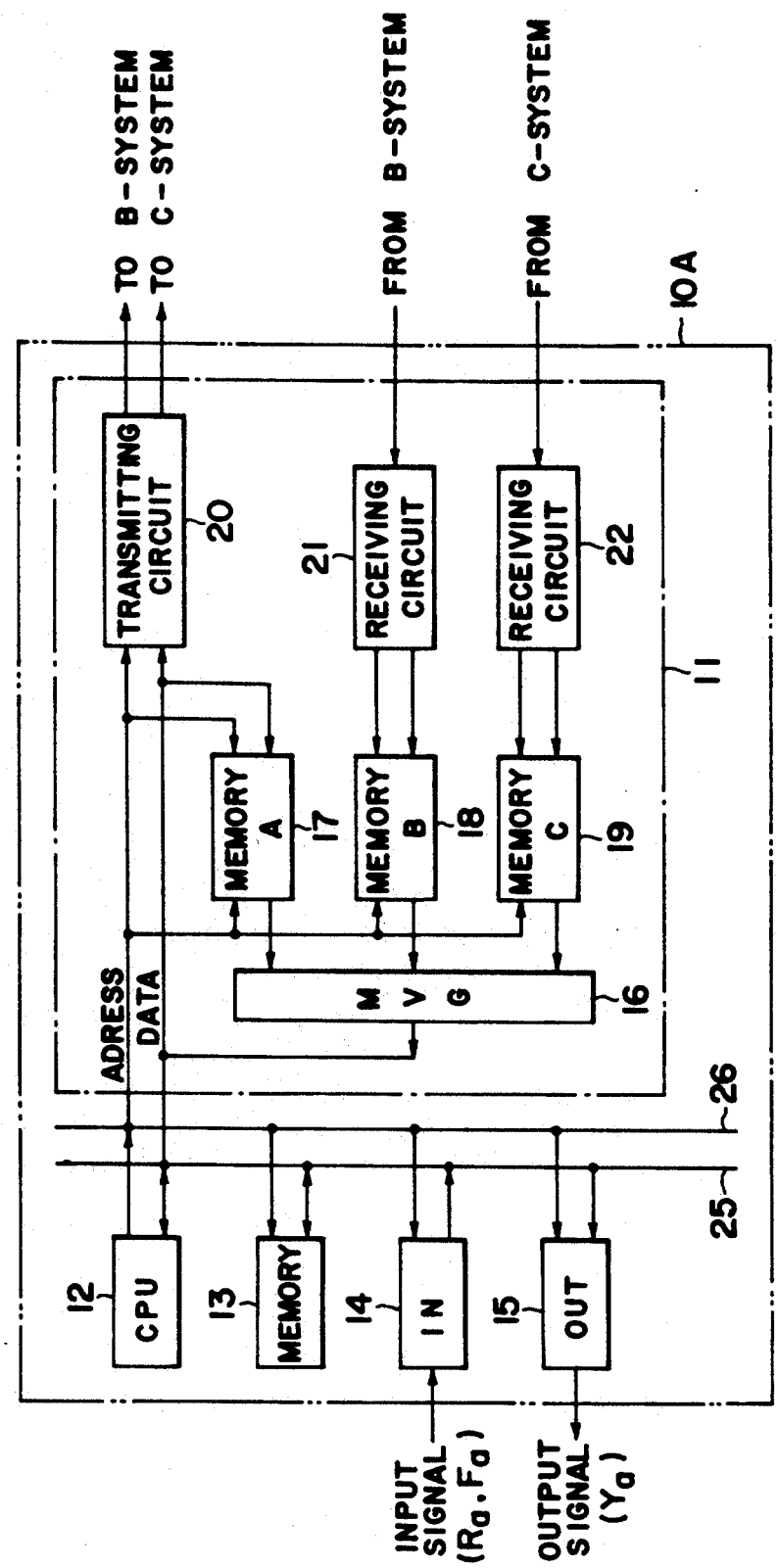
FIG. 2 is a block diagram showing an internal configuration of each control circuit of the multiplexed digital control device according to the present invention.

FIG. 2 shows an internal construction of one (10A) of the control circuits 10A, 10B and 10C which have identical construction.

The control circuit 10A includes a manipulated variable processing circuit 11, a CPU 12, a memory 13, an input circuit (IN) 14 and an output circuit (OUT) 15. The CPU 12, the manipulated variable processing circuit 11, the memory 13, the input circuit 14 and the output circuit 15 are mutually connected through a data bus 25 and an address bus 26. The input circuit 14 is used to input the speed command $R_a$ and the speed feedback $F_a$ and the output circuit 15 is used to provide the manipulated variable $Y_a$. The manipulated variable processing circuit 11 includes the signal selection circuit 16 such as the median selection circuit (MVG), memories 17, 18 and 19, a transmitting circuit 20 and receiving circuits 21 and 22. The memories 17, 18 and 19 serve to store data from the control circuit 10A for an A system, the control circuit 10B for a B system and the control circuit 10C for a C system, respectively, and the receiving circuits 21 and 22 are used to introduce data from the B and C system control circuits 10B and 10C to the control circuit 10A. The transmitting circuit 20 transmits A system data to the control circuits 10B and 10C. The signal selection circuit 16 selects, among data of the A, B and C systems, which are stored in the memories 17, 18 and 19, one having a specific value which corresponds to a median and stores the latter in an internal memory thereof.

The control circuits 10B and 10C have identical internal configurations to that of the control circuit 10A.

An example of control operation to be performed in the control device shown in FIG. 2 will be described with reference to a flowchart shown in FIG. 3 and an operation of the CPU and the memories shown in FIG. 4.

Figure 3:
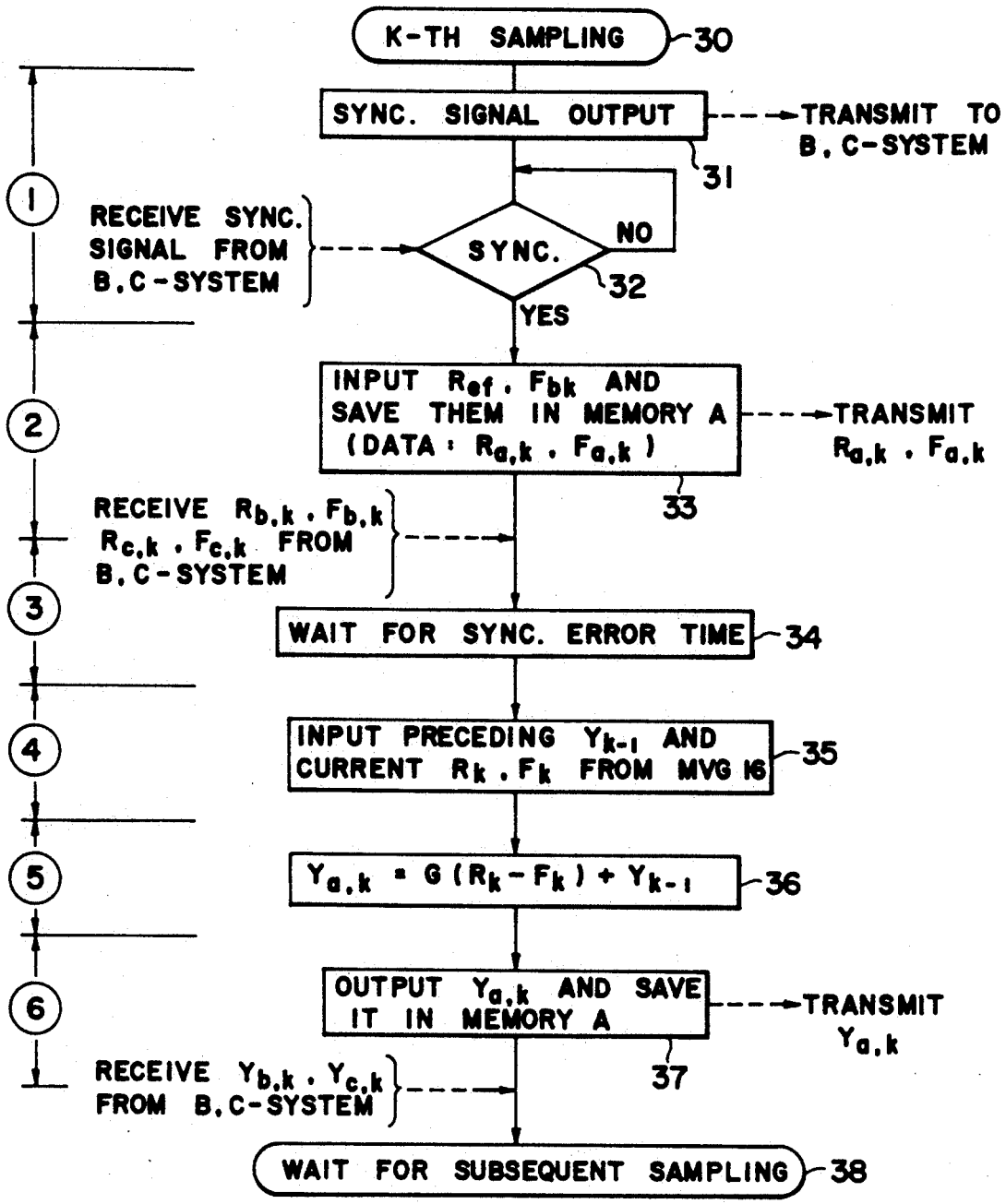
FIG. 3 is a flowchart showing an operation of the control device shown in FIG. 2.

In FIGS. 3 and 4, a series of operations to be performed in the A system control circuit 10A during a period after K-th sampling step 30 up to idling step 38 waiting for (k−1)-th sampling are shown. After the K-th sampling, the A system control circuit 10A provides a synchronizing signal in step 31 through the transmitting circuit 20 to the B and C system control circuits 10B and 10C according to a known system. Then, the circuit 10A receives synchronizing signals from the control circuits 10B and 10C and, after the synchronization among the control circuits 10A, 10B and 10C is confirmed in step 32, the control circuit 10A receives through the input circuit 14 respective input data, i.e., a speed command $R_{a,k}$ and speed feedback $F_{a,k}$ at k-th sampling and stores them in the memory 17. At the same time, the circuit 10A transmits them through the transmitting circuit 20 to the control circuits 10B and 10C in step 33. The control circuit 10A also receives speed command data $R_{b,k}$ and $R_{c,k}$ and speed feedback data $F_{b,k}$ and $F_{c,k}$ from the control circuits 10B and 10C through the receiving circuits 21 and 22 thereof and stores them in the memories 18 and 19, respectively. Thereafter, the circuit 10A waits for a time corresponding to a synchronizing error time in step 34. Then, in step 35, a median of the data obtained by the signal selection circuit 16 at a preceding sampling time, i.e., at (k−1)th sampling time, i.e., a manipulated variable $Y_{k-1}$ corresponding to a median of respective manipulated variables $Y_{a,k-1}$ and $Y_{c,k-1}$, a speed command $R_k$ corresponding to a median of speed commands $R_{a,k}$, $R_{b,k}$ and $R_{c,k}$ obtained in a current sampling time and a speed feedback $F_k$ corresponding to a median of speed feedback signals $F_{a,k}$, $F_{b,k}$ and $F_{c,k}$ obtained in this sampling time are delivered from the signal selection circuit 16 to the CPU 12. The CPU 12 is responsive to the inputs from the signal selection circuit 16 to perform the following operations to thereby obtain a manipulated variable $Y_{a,k}$ at k-th sampling time of the A system, in the step 36.

$$Y_{a,k} = G(R_k - F_k) + Y_{k-1} \qquad (1)$$

where G is a gain of the speed control system in the control circuit 10A.

In step 37, the manipulated variable $Y_{a,k}$ obtained according to the equation (1) is outputted from the output circuit (OUT) 15 as an output of the control circuit 10A, stored in the memory 17 and transmitted through the transmitting circuit 20 to the other control circuits 10B and 10C and the manipulated variables $Y_{b,k}$ and $Y_{c,k}$ transmitted from the control circuits 10B and 10C are received through the receiving circuits 21 and 22 and stored in the memories 18 and 19, respectively. The respective data thus stored are used for data processing at a subsequent, (K+1)-th sampling. Thereafter, in step 38, the operation becomes idle until the (K+1)-th sampling.

The same operation is performed simultaneously in each of the control circuits 10B and 10C to store, transmit, receive and output respective data.

The manipulated variables $Y_{a,k}$, $Y_{b,k}$ and $Y_{c,k}$ of the respective systems obtained in this manner are introduced into the signal selection circuit 7 in which they are compared with each other to select a median of them as the manipulated variable $Y_{o,k}$ of the whole device at K-th sampling time. This manipulated variable is the final manipulated variable $Y_o$ on which the output current of the variable current source 4, i.e., the armature current $I_a$ is controlled.

As described, by transmitting data mutually updated between the respective control systems, it is possible to minimize the amount of data transmitting/receiving and eliminate the time necessary to wait for respective data. Therefore, in the above described control device, the sampling period can be shortened, so that it can be applied properly to even highly variable, high speed signal processing.

Waveforms in FIG. 5 show the relationship between a speed command $R_o$, a speed feedback $F_o$ and an armature current $I_a$ at respective sampling times numbered K−2, K−1, K, K+1, K+2 and K+3, in which the speed command $R_o$ is stepped up immediately before the K−1 sampling. When the stepped-up speed command $R_o$ is obtained as a sampling value at the K−1 sampling time, the manipulated variable $Y_o$ is also stepped up according to the result of data processing mentioned above. Thus, the armature current $I_a$ from the variable current source 4 is stepped up after the K−1 sampling time to increase the speed feedback $F_o$ gradually to thereby accelerate the motor 2. When the motor speed and hence the speed feedback $F_o$ becomes equal to the speed command $R_o$ at the K−1 sampling time, the armature current $I_a$ is reduced to its initial value, so that the acceleration disappears and steady operation of the motor is established according to the new speed command.

FIG. 6 is a block diagram of another embodiment of the present invention. Components in FIG. 6 which are the same as or similar to those shown in FIG. 2 are depicted by same reference numerals, respectively. A control circuit 10D in FIG. 6 comprises an abnormality detection circuit 23 responsive to data stored in memories 17, 18 and 19 for detecting an abnormality thereof and a first-in/first-out (FIFO) memory 24 connected to an output of the abnormality detection circuit.

In the control circuit 10D shown in FIG. 6, a CPU 12 reads necessary data of three control systems from the memories 17, 18 and 19 of a manipulated variable processing circuit 11 and a signal selection circuit 16 selects a median thereof. Simultaneously, the abnormality detection circuit 23 compares data for the three control circuits to obtain a deviation on which an abnormality is detected. When an abnormality is detected, an address of the data and the number indicative of a control system determined as abnormal are stored in the FIFO memory 24. The FIFO memory 24 includes a counter which counts the number of storings, so that it can output the number of abnormality detections, data detected as abnormal and the address thereof when requested by the CPU 12.

According to the control circuit shown in FIG. 6, not only the triplexed median selection but also the checking of abnormal data for estimation of location of malfunction become possible without increasing workload of the CPU 12. Therefore, it is possible to easily add an estimation function of abnormal location to a high speed control system.

What is claimed is:

1. A multiplexed digital control device, comprising:
a plurality of control systems each of which outputs a manipulated variable necessary to make a controlled variable from a common controlled system coincident with a common command; and
main signal selection means for selecting a specific signal among said manipulated variables output from said plurality of control systems, according to a predetermined logic, wherein each of said plurality of control systems, comprises:
a first memory for storing an internal data obtained as a result of a control operation;
transmitting means for directly transmitting said internal data with an address information to the other control systems;
receiving means for receiving said internal data of said other control systems transmitted thereto;
second memories for storing said internal data transmitted from said other control systems and received by said receiving means at the addresses designated by the address information transmitted;
sub-signal selection means for reading out said internal data, from said first and second memories, and selecting a specific data from said data readout, according to said predetermined logic, and determining said manipulated variable of one of said control systems on the basis of the selected specific data; and
output means for outputting said manipulated variable determined by said sub-signal selection means to said main signal selection means.

2. The device claimed in claim 1, wherein said main signal selection means serves to select one of said manipulated variables outputted from said respective control systems which corresponds to a median.

3. The device claimed in claim 1, wherein said sub-signal selection means serves to select one of said internal data of said respective control systems for an identical input signal, which corresponds to a median.

4. The device claimed in claim 3, wherein said sub-signal selection means serves to correct a first value corresponding to a median of said outputted manipulated variables of said respective control systems obtained at a preceding sampling time with a value obtained by multiplying a deviation between a second value corresponding to a median of commands obtained in said respective control systems at a current sampling and a third value corresponding to a median of controlled variables of said respective control systems at a current sampling with a gain to obtain an output manipulated variable of said device at the current sampling.

5. The device claimed in claim 1, further comprising abnormality detection means for detecting an abnormality of said internal data stored in said first and second memories, and a third memory for storing an internal data detected by said abnormality detection means as being abnormal.

6. The device claimed in claim 5, wherein said third memory comprises a first-in/first-out memory.

7. A multiplexed digital control device, comprising:
a plurality of control systems each of which outputs a manipulated variable necessary to make a controlled variable from a common controlled system coincident with a common command; and
main signal selection means for selecting a specific signal among said manipulated variables output from said plurality of control systems, according to a predetermined logic, in accordance with a median preceding manipulated variable, a median current speed command, and a median current speed feedback signal, wherein each of said plurality of control systems, comprises:
a first memory for storing an internal data obtained as a result of a control operation;
transmitting means for transmitting said internal data with an address information to the other control systems;
receiving means for receiving said internal data of said other control systems transmitted thereto;
second memories for storing said internal data transmitted from said other control systems and received by said receiving means at the addresses designated by the address information transmitted;
sub-signal selection means for reading out said internal data, from said first and second memories, and selecting a specific data from said data readout, according to said predetermined logic, and determining said manipulated variable of one of said control systems on the basis of the selected specific data; and
output means for outputting said manipulated variable determined by said sub-signal selection means to said main signal selection means.

8. The device claimed in claim 7, wherein said sub-signal selection means serves to correct a first value corresponding to said median preceding manipulated variable with a value obtained by multiplying a deviation between a second value corresponding to said median current speed command and a third value corresponding to said median current speed feedback signals with a gain to obtain an output manipulated variable of said device at the current sampling.

9. The device claimed in claim 7, further comprising abnormality detection means for detecting an abnormality of said internal data stored in said first and second memories, and a third memory for storing an internal data detected by said abnormality detection means as being abnormal.

10. The device as claimed in claim 9, wherein said third memory means comprises a first-in/first-out memory.

* * * * *